(12) United States Patent
Kempster (10) Patent No.: US 10,920,348 B2
(45) Date of Patent: Feb. 16, 2021

(54) METHOD OF COMPRESSING MAN-MADE VITREOUS FIBRE WEB

(71) Applicant: Rockwool International A/S, Hedehusene (DK)

(72) Inventor: Vincent Paul Kempster, South Wales (GB)

(73) Assignee: ROCKWOOL INTERNATIONAL A/S, Hedehusene (DK)

(*) Notice: Subject to any disclaimer, the term of this patent is extended or adjusted under 35 U.S.C. 154(b) by 275 days.

(21) Appl. No.: 15/544,617

(22) PCT Filed: Feb. 16, 2016

(86) PCT No.: PCT/EP2016/053278
§ 371 (c)(1),
(2) Date: Jul. 19, 2017

(87) PCT Pub. No.: WO2016/131831
PCT Pub. Date: Aug. 25, 2016

(65) Prior Publication Data
US 2018/0274142 A1    Sep. 27, 2018

(30) Foreign Application Priority Data
Feb. 16, 2015  (EP) .................................. 15155256

(51) Int. Cl.
*D04H 3/08* (2006.01)
*B29C 43/00* (2006.01)
(Continued)

(52) U.S. Cl.
CPC ............. *D04H 3/08* (2013.01); *B29C 43/003* (2013.01); *D04H 1/4218* (2013.01); *D04H 1/44* (2013.01);
(Continued)

(58) Field of Classification Search
CPC ........................... B32B 2262/108; B30B 5/06
See application file for complete search history.

(56) References Cited

U.S. PATENT DOCUMENTS 3,902,878 A * 9/1975 Hoag, Jr. ............. C03B 37/048
65/447
5,431,992 A * 7/1995 Houpt ................. C03B 37/045
442/353
(Continued)

FOREIGN PATENT DOCUMENTS

| | | |
|---|---|---|
| EP | 1026301 A3 | 8/2000 |
| FR | 2579231 A1 | 9/1986 |
| WO | 03054264 A1 | 7/2003 |

OTHER PUBLICATIONS

Extended European Search Report dated Jul. 20, 2015 for corresponding European Application No. 15155256.9.
(Continued)

*Primary Examiner* — Benjamin A Schiffman
(74) *Attorney, Agent, or Firm* — Tarolli, Sundheim, Covell & Tummino LLP (57) ABSTRACT

According to the invention, there is provided a method of compressing an uncured man-made vitreous fibre web, the web having two opposed major faces. The method comprising the steps: passing the web along a path; and subjecting the web to thickness compression by applying compression to the two major opposed faces of the web. Compression of each of said major faces of the web is applied by passing the path between converging continuous or discontinuous compression surfaces. Further, the respective major face of the web that is being compressed is in contact with one of the converging compression surfaces, and said converging compression surface is inclined towards the path. Additionally, each inclined converging compression surface applies an amount of compression to the major face of the web with (Continued)

which the respective inclined converging surface is in contact, wherein the amount of compression applied to at least one of the two opposing major faces of the web is adjustable.

7 Claims, 5 Drawing Sheets

(51) Int. Cl.
    *D04H 1/44*          (2006.01)
    *D04H 3/05*          (2006.01)
    *D04H 1/4218*        (2012.01)
    *D04H 17/12*         (2006.01)
    *D04H 1/4209*        (2012.01)
    *D04H 3/002*         (2012.01)
    *B29C 43/46*          (2006.01)
    *B29C 43/48*          (2006.01)
    *B29C 43/58*          (2006.01)
    *B29C 43/24*          (2006.01)
    *B30B 11/22*          (2006.01)

(52) U.S. Cl.
    CPC ............... *D04H 3/05* (2013.01); *B29C 43/24* (2013.01); *B29C 2043/467* (2013.01); *B29C 2043/483* (2013.01); *B29C 2043/486* (2013.01); *B29C 2043/5825* (2013.01); *B30B 11/22* (2013.01); *D04H 1/4209* (2013.01); *D04H 3/002* (2013.01); *D04H 17/12* (2013.01)

(56) References Cited

U.S. PATENT DOCUMENTS

| | | | | |
|---|---|---|---|---|
| 5,571,610 | A * | 11/1996 | Loftus | B29C 70/16 428/297.4 |
| 5,786,082 | A * | 7/1998 | Evans | C03B 37/045 428/369 |
| 6,248,420 | B1 * | 6/2001 | Brandt | D04H 1/4209 428/113 |
| 7,090,794 | B2 * | 8/2006 | Pedersen | B65H 35/00 264/112 |
| 2002/0189740 | A1 * | 12/2002 | Carter | B30B 5/06 156/62.2 |
| 2003/0213380 | A1 * | 11/2003 | Sebastian | B27N 3/24 100/151 |
| 2010/0000170 | A1 * | 1/2010 | Parks | F16L 59/026 52/411 |
| 2010/0090359 | A1 * | 4/2010 | Schuermann | B27N 3/14 264/40.1 |

OTHER PUBLICATIONS

International Search Report and Written Opinion dated May 18, 2016 for corresponding International Application No. PCT/EP2016/053278.

* cited by examiner (PRIOR ART)

METHOD OF COMPRESSING MAN-MADE VITREOUS FIBRE WEB

RELATED APPLICATIONS

The present application is a U.S. National Stage Application under 35 USC 371, claiming priority to PCT Serial No. PCT/EP2016/053278, filed on Feb. 16, 2016; which claims priority to European Patent Application Serial No. 15155256.9, filed on Feb. 16, 2015, the entirety of all of which are incorporated herein by reference.

FIELD OF THE INVENTION

This invention relates to methods for compression of man-made vitreous fibre webs, in particular to thickness compression of such webs.

BACKGROUND

Generally, man-made vitreous fibre web is formed from spun man-made vitreous fibres, conventionally termed mineral fibres. The mineral fibres are provided by a process of spinning a mineral melt to form fibres, which are collected, together with binder for the fibres, on a conveyor belt to form a relatively thin, low density primary fibre web. This is passed along the conveyor and commonly subjected to a pendulum process where the primary web is passed down between two pendulum conveyor belts towards a collection conveyor belt. The two pendulum conveyor belts swing in a pendulum-like manner in a direction perpendicular to the direction of movement of the collection conveyor belt, so as to fold the primary web over on itself. This forms another, secondary, web that is steadily transported by the collection conveyor belt at a speed that ensures the folding process produces a secondary web with a generally uniform thickness.

The secondary web that is produced is generally continuous in length and has two opposing minor faces forming upright sides and two opposing major faces (i.e. upper and lower faces) with dimensions along and across the web only.

Once formed, this web is often subjected to various forms of compression to improve some of the characteristics of the web, such as fibre orientation, and variation in density. This is usually done by passing the web through a series of conveyor belts and/or rollers.

There are two general forms of compression that can be applied to the web. These are lengthwise compression (corresponding to a reduction in the length of the web per unit volume of the web) and thickness compression (corresponding to a reduction in the height of the web per unit volume).

To apply any form of compression, the web is passed along a predetermined path through the conveyor belts and/or rollers. The path is defined by the route followed by the web, which is set, at least in part, by a lower surface and an upper surface between which the web is passed. Each of the upper and lower surfaces maintains contact with a major face of the web, since it is usually the major faces of the web that are in direct contact with the conveyor belts and/or rollers.

In the case where a conveyor belt is used, the belt of each conveyor belt provides a continuous surface with which to interact with the web. In the case where a series of rollers is used, these form a discontinuous surface along which the web is passed, and the section of each roller that is in contact with a major face of the web forms a portion of said discontinuous surface.

To apply lengthwise compression, the web is passed from one set of conveyor belts or rollers that are moving at one speed, to a second set of conveyor belts or rollers that are moving at a second speed that is slower than the speed of the conveyor belts/rollers from which the web is passed. This causes the web to be compacted along its length, thereby applying compression.

To apply thickness compression, one of the surfaces in contact with one of the major faces of the web is inclined towards the path along which the web is being transported, and is inclined in the direction in which the web is being transported. This forces the major faces of the web towards each other, reducing the height of the web and therefore applying compression.

Once appropriate compression steps have been taken, the compressed web can be passed through a curing oven in order to cure the binder.

These processes are all well-known. In particular, this method of applying thickness compression to a web is a standard method in the industry. However, we have found that using this method can lead to the generation of a density gradient across the web thickness. In other words, we have found that it can be the case that the density is not consistent through a vertical section of the web when the web has been subject to thickness compression in this manner. These density variations can be unwanted, and can cause problems when the web is then put to use.

For example, when such a web is used as part of a roofing product, it is intended that the product is capable of being walked on. However, with density variations in the web, there will be points of weakness in the web due to the density variations, which could result in the product being damaged when it is walked on. As such, a solution to the problem of unwanted density variation is needed.

EP1026301A1 discloses an apparatus used to treat a cured web. The apparatus is intended to elastify a cured web by breaking the bonds between fibres and binder in the web that are produced when curing the web. Additionally, a compression zone is disclosed as part of the apparatus. This includes a first conveyor belt section and a second conveyor belt section between which the cured web is passed in use. The first conveyor belt section comprises a deflection roller and a driving roller. There is also a tension roller in contact with the internal upper side of the conveyor belt that is not in contact with the cured web. This maintains the tension of the conveyor belt while a pressing roller moves reciprocally between the deflection and driving rollers at a considerably higher frequency than the conveying speed of the conveyor belt. The pressing roller moves in an arc dictated by the tension roller.

FR2579231A1 discloses a device used to re-orientate a primary or secondary web, or a cured web, by ninety degrees (90°). The disclosed device has a first set of rollers that cause the web to follow a path towards a pendulum with a knife edge. In use, the pendulum is swung at a predetermined frequency to determine the amount of web above the knife edge before the web is cut by the knife edge. Once cut, the web is passed along a further set of rollers that are perpendicular to the first set of rollers, the web thereby having been reoriented by 90°, thus changing the orientation of the fibres. A second set of rollers is also disclosed that holds the web against the first set of rollers. In combination, the first and second sets of rollers apply thickness compression to the web. Additionally, the path followed by the first set of rollers is able to be changed.

SUMMARY OF INVENTION

According to a first aspect, there is provided a method of compressing an uncured man-made vitreous fibre web, the web having two opposed major faces, wherein the method comprises the steps: passing the web along a path; and subjecting the web to thickness compression by applying compression to the two major opposed faces of the web, wherein compression of each of said major faces of the web is applied by passing the path between converging continuous or discontinuous compression surfaces, wherein the respective major face of the web that is being compressed is in contact with one of the converging compression surfaces, wherein said converging compression surface is inclined towards the path, and wherein each inclined converging compression surface applies an amount of compression to the major face of the web with which the respective inclined converging surface is in contact, wherein the amount of compression applied to at least one of the two opposing major faces of the web is adjustable.

By applying this method, the two major opposing faces of the web are each directed towards the other major face, and towards the path along which the web is travelling, ensuring that the compressive force applied by each inclined surface is applied to the two major opposing faces of the web. Previously, two inclined compression surfaces have not been used. Having a single inclined surface does allow compression to be experienced by both sides of the web, and is a more simple arrangement to build into a production line, and so has hitherto been considered to be acceptable in the industry. However, we have found that by providing compression surfaces that apply compression to each one of the two opposing major faces of the web, by means of each compression surface being inclined towards the path along which the web is travelling, the variation in density across the height of the web is significantly reduced. This therefore provides a more uniform web with a known amount of thickness compression and a predictable, consistent, and reliable density.

This arrangement also improves the symmetry of the compression of the web, causing more even compression, which we have found reduces the density variation through the thickness of the web. This is achieved by actively applying pressure to each major face of the web, which means comparable amounts of pressure are applied at each major face of the web. This is instead of the previously used method where pressure is applied actively to only one of the major faces, resulting in uneven compression forces and undesirable density variations in the web.

By applying compression to both of the major faces, the amount of compressive force (and therefore pressure) that is required to be applied directly to each respective surface is reduced, because the same overall compression force is applied to two surfaces instead of one. This means that the web does not undergo as much local compression at any particular point. This allows the structure of the web to be maintained, because it is less likely to be damaged by the forces it experiences during compression, which reduces the degradation in uniformity of the web caused by the thickness compression. Accordingly, an improved web can be produced.

Each surface of the converging surfaces through which the path passes may be inclined towards the path in series. For example, relative to the direction in which the web is being transported, the converging compression surface that is in contact with an upper major face of the web may be inclined towards the path first, with the converging compression surface that is in contact with a lower major face of the web being inclined towards the path further along the path (i.e. second) such that the two opposing major faces of the web undergo compression in series (i.e. one after the other).

Typically however, and preferably, each surface of the converging surfaces through which the path passes is inclined towards the path, and compression is thereby applied to the two opposing major faces simultaneously. In other words, each surface is inclined towards the path in the same section of the path. This allows the distance over which the thickness compression is applied to be kept to a minimum, and ensures that the changes in density are induced simultaneously at each of the opposing major faces. This reduces the possibility of irregularities in the density of the web that could be introduced when compressing the web in series.

According to a second aspect, there is provided a method of compressing a man-made vitreous fibre web, the web having two opposed major faces, wherein the method comprises the steps: passing the web along a path; and subjecting the web to thickness compression by applying compression to the two major opposed faces of the web, wherein compression of each of said major faces of the web is applied by passing the path between converging continuous or discontinuous compression surfaces, wherein the respective major face of the web that is being compressed is in contact with one of the converging compression surfaces, wherein each surface of the converging surfaces through which the path passes is inclined towards the path, and compression is thereby applied to the two opposing major faces simultaneously, and wherein each inclined converging compression surface applies an amount of compression to the major face of the web with which the respective inclined converging surface is in contact, wherein the amount of compression applied to at least one of the two opposing major faces of the web is adjustable.

For the second aspect, the web may be a cured web, but typically, the man-made vitreous fibre web is an uncured man-made vitreous fibre web. Additionally, in all aspects, the web may be a primary web. Typically however, the web is a secondary web.

For each of the first and second aspects, each inclined converging compression surface may apply an amount of compression to the major face of the web with which the respective inclined converging surface is in contact. The amount of compression applied by each surface may be fixed, though typically the method further includes the step of adjusting the amount of compression applied to at least one of the two opposing major faces of the web. This allows the resulting density distribution within the web to be adjusted when required, for example when it is seen to be changing following monitoring, or when a different density distribution is required.

The amount of compression applied by each inclined converging compression surface is proportional to an angle of incline of the respective inclined converging compression surface. The amount of compression applied by each inclined converging compression surface may also be proportional to a number of other factors, such as speed of transport and/or length of compression surface. For instance the speed of the transport of the web or the length of the compression surface may be adjustable. However, typically, the amount of compression is adjusted by altering the angle of the incline towards the path, of the converging compression surface that applies compression. This allows the amount of compression applied to be adjusted by an adjustment of the incline of the relevant converging compression surface without the need to significantly alter the structure of the system that is transporting the fibre web or having to reconfigure the speed at which the web is transported.

The converging compression surfaces may each be continuous or discontinuous compression surfaces.

For instance, at least one of the converging compression surfaces is a discontinuous compression surface formed of a plurality of transport rollers that transport the web. In such a case the transport rollers will, as is conventional, be arranged parallel to one another, with their axes perpendicular to the direction of travel of the web, and in close proximity to one another, such that their cylindrical surfaces are closely spaced. Alternatively, at least one of the converging compression surfaces is a continuous compression surface formed of at least part of a conveyor belt that transports the web. Generally it is preferred either that both compression surfaces are continuous or that both compression surfaces are discontinuous, but combinations can also be used wherein one compression surface is a continuous compression surface and the other is a discontinuous compression surface.

There are different advantages associated with the two types of compression surface, which can be used as appropriate depending on which are most significant in any given case. By having a discontinuous compression surface formed of a plurality of rollers, the respective compression surface is simple in construction, thereby reducing the likelihood of failure of the surface, and therefore making it easier to maintain. When the respective compression surface is a continuous surface formed of at least part of a conveyor belt, the support and compression provided to the respective major face of the web is consistent and uniform, which enables reliable compression.

An option is that the converging compression surfaces each form part of a guiding surface, the guiding surfaces forming a guide for the web, the web thereby passing between the guiding surfaces, wherein each compression surface that is inclined towards the path is the only part of the respective guiding surface applying thickness compression to the web.

When using a conveyor belt, the belt may slide along a surface that supports it. Typically though, each conveyor belt has a set of support rollers supporting the respective conveyor belt, and wherein the arrangement of the support rollers in each set of support rollers defines a route followed by the respective conveyor belt. Using a set of support rollers enables the route followed by the respective conveyor belt to be tailored to the particular process more easily than when a surface is used to support the conveyor belt.

Typically, each continuous converging compression surface is a portion of the route followed by the respective conveyor belt, and said portion is delimited by two support rollers of the set of support rollers supporting the respective conveyor belt. The respective conveyor belt may be supported by other support rollers. There may also be one or more support rollers supporting the respective conveyor belt that are located between the two support rollers which delimit the portion of the conveyor belt that forms the continuous converging compression surface.

An alternative to having two support rollers that delimit the continuous converging compression surface is to have one or more guide supports defining a bend in the route that is followed by the conveyor belt. Such guide supports delimit the portion of the respective conveyor belt that is to form the continuous converging compression surface. However, having a support roller is more likely to keep the conveyor belt taut and keeps the belt from sticking in place.

Each of the at least one of the two rollers that delimits the portion that is moved can be a roller of an upper converging compression surface configured to apply compression to an upper major face of the web. However typically, each of the at least one of the two rollers that delimits the portion that is moved is a roller that delimits a portion of a lower converging compression surface configured to apply compression to a lower major face of the web.

To meet the desired standard, a web must have a density above a minimum density. Accordingly, the apparatus used to compress the web is commonly set to compress the web so that all parts of the web meet the minimum density criteria.

Usually, the lower major face of a web has a lower density than the opposing upper major face. Accordingly, to meet the minimum density criteria, the apparatus is commonly set to produce a higher density than the density specified by the minimum density criteria so that the lower major face meets the minimum density criteria as well as the upper major face meeting that criteria.

By applying thickness compression to the lower major face of the web, the density differential between the density of the upper major face of the web and the lower major face of the web is reduced. As such, the web density that the apparatus is set to produce can be reduced because the lower major face of the web will not have a density that is significantly lower than that of the upper major face of the web. This is beneficial because it allows less wear on the apparatus and less overall compression to be applied requiring less energy to be applied to compress the web. Having the moveable roller(s) on the lower face allows the amount of compression applied to the lower major face of the web to be adjusted so that variation between the density of the upper major face and the lower major face can be reduced by adjustment of the appropriate roller(s).

Each of the at least one of the two rollers that delimits the portion that is moved may be moved only substantially perpendicular to an over surface of the upper converging compression surface. Typically though, each of the at least one of the two rollers that delimits the portion that is moved is moved only substantially perpendicular to an under surface of the lower converging compression surface. Further, each of the at least one of the two rollers that delimits the portion that is moved is moved only vertically.

It is possible to move both of the two support rollers that delimit the portion of the route which is followed by the respective conveyor belt, in order to adjust the amount of compression applied to the respective major face of the web. Typically though, the method further comprises the step of moving only one of the two support rollers that delimits the portion which is towards or away from the path of the web, thereby adjusting the amount of compression that is applied to the respective major face of the web by the respective continuous converging compression surface when said support roller is moved. If a discontinuous converging compression surface is used, one transport roller of such a surface will preferably be moved to adjust the incline of a discontinuous surface.

When a moveable support roller is provided, it preferably has diameter less than that of the other support rollers.

Each support roller that is moved preferably has a diameter of about 0.10 metres (m) to about 0.30 metres.

Each support roller that is moved preferably has a length of about 2 metres to about 4 metres.

By moving just one of the two support rollers that delimit the portion, a minimum number of moving parts is required, reducing the likelihood of failure of an adjustment in the incline due to the failure of one or more components.

It is however possible to carry out such adjustment by moving more than one roller or support roller. If there are rollers located between the two support rollers delimiting the portion which is towards or away from the path of the web, these will also be moved by a required amount, Each compression surface may be curved or may be planar. A planar compression surface allows a more consistent and uniform amount of compression to be applied along the length of the respective compression surface leading to improved compression thickness of the web over a curved compression surface. However, a curved compression may be more suitable for other reasons, such as where the path along which the web is transported has a bend that passes through the compression surfaces.

Further, the amount of compression may be adjusted when thickness compression of the web is in progress or may be adjusted before thickness compression of the web is initiated. By adjusting the amount of thickness compression applied when thickness compression is in progress, compression of the web can be varied along a length of the web. This also allows the web to be fed through the compression surfaces continuously. By adjusting the amount of thickness compression applied before the compression is initiated, the amount of thickness compression can be set to a desired level without risking variation in the amount of compression applied to part of the web.

Although the at least one of the two rollers that is moveable may be moveable in any direction, typically the movable at least one of the two rollers that delimits the portion is moveable only vertically. This keeps the mechanism for moving the roller simple to manufacture and reliable to operate.

According to a third aspect, there is provided a compression apparatus suitable for applying thickness compression to an uncured man-made vitreous fibre web, the web having two opposed major faces, wherein the compression apparatus is configured to transport a web along a path in use, the compression apparatus comprising: a pair of converging continuous or discontinuous compression surfaces between which the path of the web passes, wherein each surface of the pair of converging compression surfaces is inclined towards the path in the direction along which the web is transported in use, and wherein, in use, each surface of the converging compression surfaces is in contact with one of the two opposed major faces of the web, each surface thereby applying thickness compression to the major face of the web with which the respective surface is in contact when the web is transported along the path, and wherein the incline of at least one surface of the pair of converging compression surfaces is adjustable.

The compression apparatus can be interpreted as acting as a "densifier". In other words, due to the compression that the compression apparatus is able to apply, the density of the web is increased due to the major faces of the web being pushed closer together, reducing the amount of volume occupied by the same amount of material.

According to a fourth aspect, there is provided a compression apparatus suitable for applying thickness compression to a man-made vitreous fibre web, the web having two opposed major faces, wherein the compression apparatus is configured to transport a web along a path in use, the compression apparatus comprising: a pair of converging continuous or discontinuous compression surfaces between which the path of the web passes, wherein each surface of the pair of converging compression surfaces is inclined towards the path in the direction along which the web is transported in use, and wherein, in use, each surface of the converging compression surfaces is in contact with one of the two opposed major faces of the web, each surface thereby applying thickness compression to the major face of the web with which the respective surface is in contact when the web is transported along the path, wherein each surface of the converging surfaces through which the path passes in use is inclined towards the path, and compression is thereby applied to the two opposing major faces simultaneously in use and wherein the incline of at least one surface of the pair of converging compression surfaces is adjustable. As with the first and second aspects, this aspect has the same beneficial effects as the third aspect.

For each of the third or fourth aspects, at least one of the compression surfaces may be a continuous compression surface, the compression apparatus further comprising conveyor belts, each continuous compression surface forming at least a part of a conveyor belt, each continuous compression surface being the only portion of the respective conveyor belt inclined towards the path.

Alternatively or additionally, at least one of the compression surfaces may be a discontinuous compression surface, the compression apparatus further comprising a plurality of rollers, each discontinuous compression surface forming at least a part of a series of rollers, each discontinuous compression surface being the only portion of the respective conveyor belt inclined towards the path.

According to a fifth aspect, there is provided a compression apparatus suitable for applying thickness compression to a man-made vitreous fibre web, the web having two opposed major faces, the compression apparatus comprising: a plurality of sets of rollers, wherein the rollers are configured to transport the web along a path in use, the path passing between a pair of converging continuous or discontinuous compression surfaces, wherein in use, each major face of the web is in contact with one of the surfaces of the pair of converging compression surfaces, and wherein each surface of the pair of converging compression surfaces is inclined towards the path in the direction along which the web is transported in use thereby applying compression to the major face of the web with which the respective compression surface is in contact in use.

In this aspect, each set of rollers can be support rollers that support a conveyor belt so that they define the route followed by the respective conveyor belt in use. The rollers are thus configured to transport the web via the conveyor belt.

Typically, at least one, and preferably both, of the compression surfaces is a continuous compression surface, where each continuous compression surface is formed of at least a part of a conveyor belt delimited by two support rollers of the respective conveyor belt.

Also typically, an angle of incline of each continuous compression surface is proportional to an amount of compression applied to the major face with which the respective continuous compression surface is in contact in use, wherein at least one continuous compression surface has at least one of the delimiting support rollers that is moveable to adjust the angle of incline of the respective continuous compression surface thereby adjusting the amount of compression applied to each respective major face.

BRIEF DESCRIPTION OF FIGURES

Examples of a method of compressing a man-made vitreous fibre web according to the invention are described below with reference to the accompanying drawings, in which.

DETAILED DESCRIPTION

The invention may be used in a process for producing a man-made vitreous fibre batt. To produce this batt, a web (a man-made vitreous fibre web) is provided in conventional manner so that it may be processed to form such a batt. At least a part of the process for providing the web is detailed above. Once the web has been provided, it is transported along a path to process the web into a batt.

In more detail, the web and the subsequent batt are produced by a process in which man-made vitreous fibres are produced by fiberising a mineral melt. This is achieved by passing the mineral melt on to a centrifugal spinning apparatus, or spinner. Each spinner comprises at least one rotor attached to a motor. Each motor spins the respective rotor, which throws the mineral melt off the rotor in the form of fibres. As the fibres are thrown off the rotors, they are entrained into a cloud by an air stream produced by air blowers located in the spinner.

As the fibres are entrained into a cloud, if binder or other additives are to be introduced, they are introduced by injection into the air stream. The cloud of fibres is then collected as a primary web on a collector. It is common for suction to be applied at the collector to suck the fibres from the cloud (along with any other additives in the cloud) on to the collector.

Usually, the collection of the primary web is a continuous process that allows the primary web to build up over time. During the collection, the primary web is passed away from the collector at a suitable rate for maintaining the primary web at a desired thickness. Although optional, the primary web can then be cross-lapped by means of a pendulum system. The cross-lapped web forms a secondary web. The uncross-lapped primary web or the secondary web is then passed towards a curing oven. Before reaching the curing oven the web can be pressurised and compressed to shape the web for its intended use. The binder that is applied to the fibres during the fibre-formation process is usually heat-curable, and the binder is thus cured in the curing oven. This enables the binder to bond the web. Following curing, further processing can be applied to the web, and once any processing is finished, the web is cut into batts.

Figure 1:
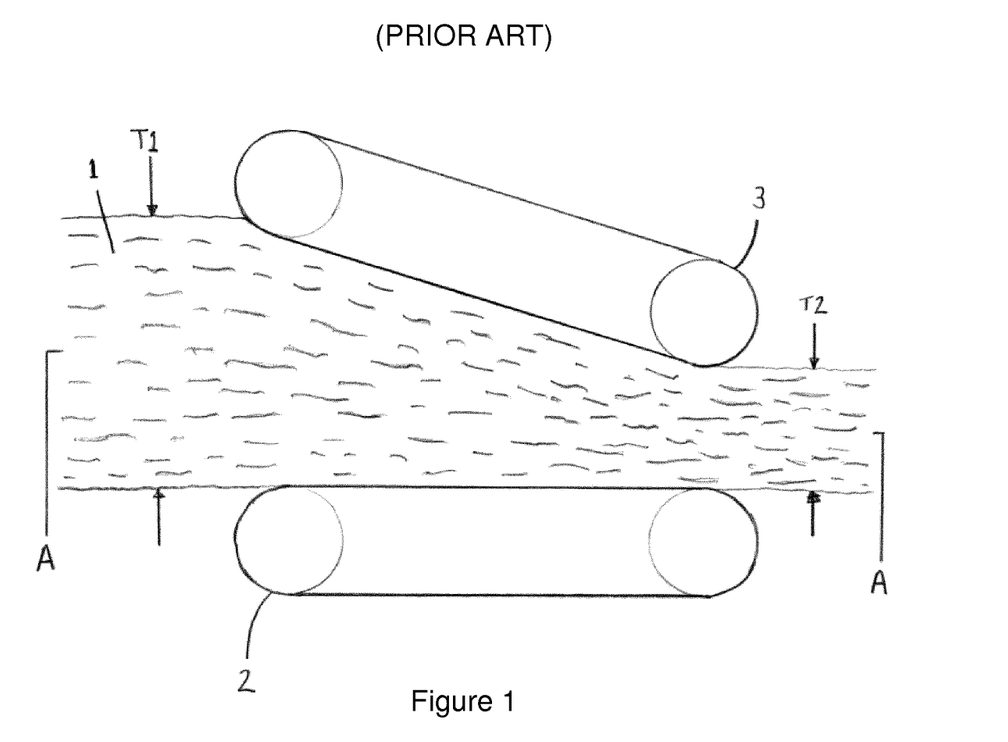
FIG. 1 is a side view of the prior art.

As described above, at least a part of the processing of the uncured web (namely, a web of man-made vitreous fibres comprising uncured binder) usually comprises applying lengthwise and/or thickness compression to the web. A conventional means for applying thickness compression to a web is shown in FIG. 1. This shows a web 1, which is being transported along path A-A in the direction indicated (i.e. from left to right on the figure).

To compress a web, the web is passed between a pair of conveyor belts, a lower conveyor belt 2 of which is horizontal, and an upper conveyor belt 3 that is inclined towards the path along which the web is being transported. Due to the incline of the upper conveyor belt, as the web travels along path A-A, the available space between the two conveyor belts reduces, so causing the web to be compressed. In FIG. 1, the thickness is reduced from thickness T1 to thickness T2, where T1 is greater than T2.

The compression of the web shown in FIG. 1 is illustrated schematically by the fibres that are shown within the body of the web converging as the web passes through the conveyor belts and becoming more densely packed.

In the arrangement shown in FIG. 1, the lower conveyor belt 2 provides a support surface onto which the web is compressed by the upper conveyor belt 3. In such an arrangement, the amount of compression applied can be easily predicted and tailored to the specific need without introducing other variables into the processing of the web.

However, we have found that by replacing the support surface with a second inclined compression surface, the density variation observed through the height of a web is significantly reduced. Accordingly, in the embodiments of the invention, compression is applied to the two major faces of the web (i.e. the uppermost face and the lowermost face of the web).

Figure 2:
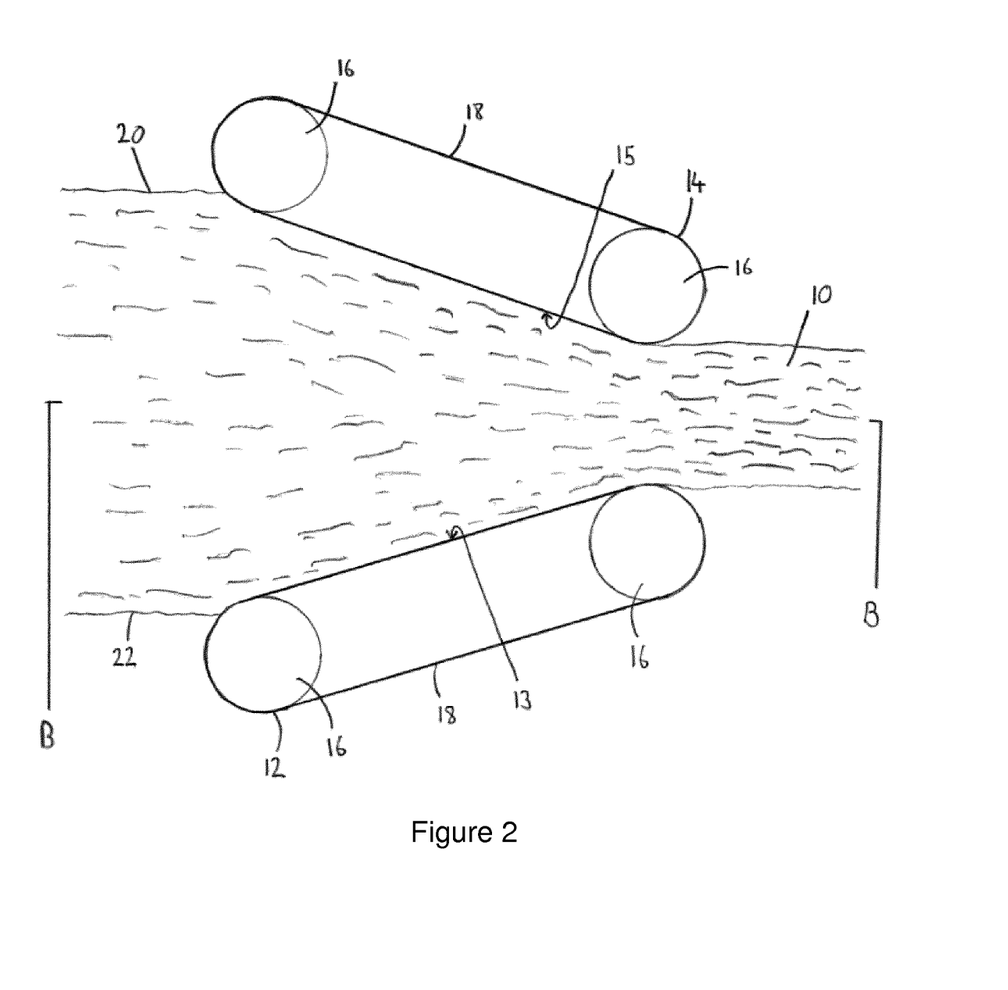
FIG. 2 is a side view of an embodiment of a compression apparatus of the invention.

An example of a compression apparatus that applies compression to each of the major faces of the web, according to the invention, is shown in FIG. 2. This shows an uncured web 10 that is transported along path B-B, which passes between a lower conveyor belt 12 and an upper conveyor belt 14.

Each of the upper conveyor belt 14 and the lower conveyor belt 12 are formed with a support roller 16 at each end. A single belt 18 is held taut between the two support rollers of each respective conveyor belt. One or both support rollers of each conveyor belt are driven to force the belt 18 to rotate around the path formed by the support rollers. There could of course be additional support rollers that are either driven or not driven located between the two support rollers at the ends of each conveyor belt. Any additional support rollers may be used to create bends or curves in the path or may be used only to support the belt, for example when the distance between the support rollers at the ends of the belt is too great to prevent the belt from flexing or stretching.

When passing between the conveyor belts, the upper major face 20 of the web 10 is in contact with the lower surface 15 of the upper conveyor belt, and the lower major face 22 of the web is in contact with the upper surface 13 of the lower belt. This allows the web to be transported when the conveyor belts 12, 14 are driven by their respective support rollers 16.

In order to transport the web 10 in the desired direction, the lower conveyor belt 12 is driven so that it rotates clockwise, and the upper conveyor belt 14 is rotated (i.e. driven by its driving support roller(s)) in an anticlockwise direction. This causes the inner surfaces of each conveyor belt to move in the same direction to transport the web.

Each of the upper conveyor belt 14 and lower conveyor belt 12 is inclined towards the path B-B along which the web 10 is transported. The incline is such that the end of each conveyor belt at which the web arrives when transported along the path is at a greater distance from the path than the end from which the web departs as it is transported further along the path, potentially to undergo further processing. Thus, each conveyor belt can be described as being inclined towards the path along which the web is transported along its length in the direction of travel of the web. In this manner, the thickness of the web is compressed as the distance between the two conveyor belts is reduced, thereby applying thickness compression to the web.

As well as having additional support rollers located between the two end support rollers shown in the figures, the end support rollers may just define the section of the conveyor belt that applies compression to the web. In other words, the conveyor belts may extend further along the path followed by the web in either direction to support the web and transport it along the route it is following thereby using other support rollers.

Instead of using conveyor belts, it is possible to use a series of rollers to transport and compress the web. An example of this is shown in FIG. 3, which shows a similar arrangement to FIG. 2, but instead of the lower conveyor belt, there is a series of rollers 24 that are able to transport the web.

The series of rollers provides a discontinuous surface (instead of the continuous surface provided by a conveyor belt), and one or more rollers, up to and including all of the rollers, may be driven. It is not necessary for all of the rollers to be driven, and it can save on the amount of energy used if only a selection of the rollers are driven.

Figure 3:
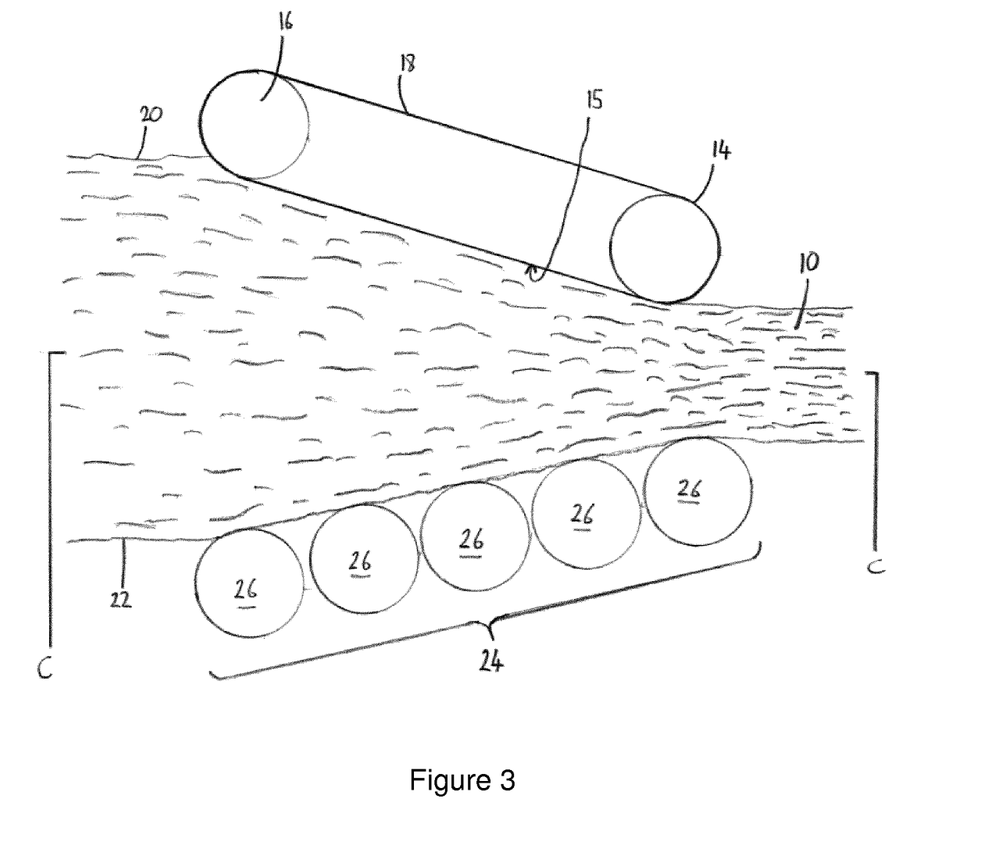
FIG. 3 is a side view of another embodiment of a compression apparatus of the invention.

In FIG. 3, the web 10 is transported along path C-C, and the discontinuous surface of the series of rollers 24 shown in FIG. 3 is inclined towards the path along which the web is transported in the same manner as the conveyor belts shown in FIG. 2 are inclined towards the path. For this to be achieved, the distance between each successive roller 26 of the series of rollers 24 and the path reduces as the distance along the path increases. In other words, the roller that is located earliest in the path has the greatest distance from the path of all of the rollers in the series. The adjacent roller then has a lesser distance from the path, and each subsequent roller has a lesser distance than the roller before it.

The difference in distance from the path of each of the rollers 26 of the series of rollers 24 is the same for each adjacent pair of rollers. This means that the discontinuous surface formed is planar. The discontinuous surface can of course be curved either to form a surface the gradient of which increases (i.e. gets steeper) as the distance along the path increases, or form a surface the gradient of which decreases (i.e. levels off) as the distance along the path increases. This is also the case for the conveyor belts 12, 14 in FIG. 2 that each form a planar surface but could have either of the two types of curved surface by locating support rollers in a suitable arrangement and applying pressure to the belts 18 (e.g. from the web) where appropriate.

In FIG. 3, the web is transported between the discontinuous compression surface of the series of rollers 24 and an upper conveyor belt 14 in the same manner in which the web is transported between the conveyor belts 12, 14 shown in FIG. 2. This results in the web undergoing thickness compression.

As shown in FIG. 3, this means that the lower major face 22 of the web 10 is in contact with the discontinuous surface formed by the series of rollers 24 and the upper major face 20 of the web is in contact with the lower surface 15 of the upper conveyor belt 14. It is of course possible to have a series of rollers in place of the upper conveyor belt 14, thereby forming a discontinuous surface in contact with the upper major face of the web. There can therefore be two discontinuous surfaces in contact with the web, or the series of rollers forming the discontinuous surface in contact with the lower major face of the web could be replaced with a conveyor belt. Additionally, regardless of the type of surfaces that are used to apply thickness compression to the web, at other points along the path along with the web is transported, rollers and/or conveyor belts can be used interchangeably.

It is sometimes desirable to be able to modify the amount of compression applied to the web. An arrangement that allows this to be done is shown in FIG. 4.

Figure 4:
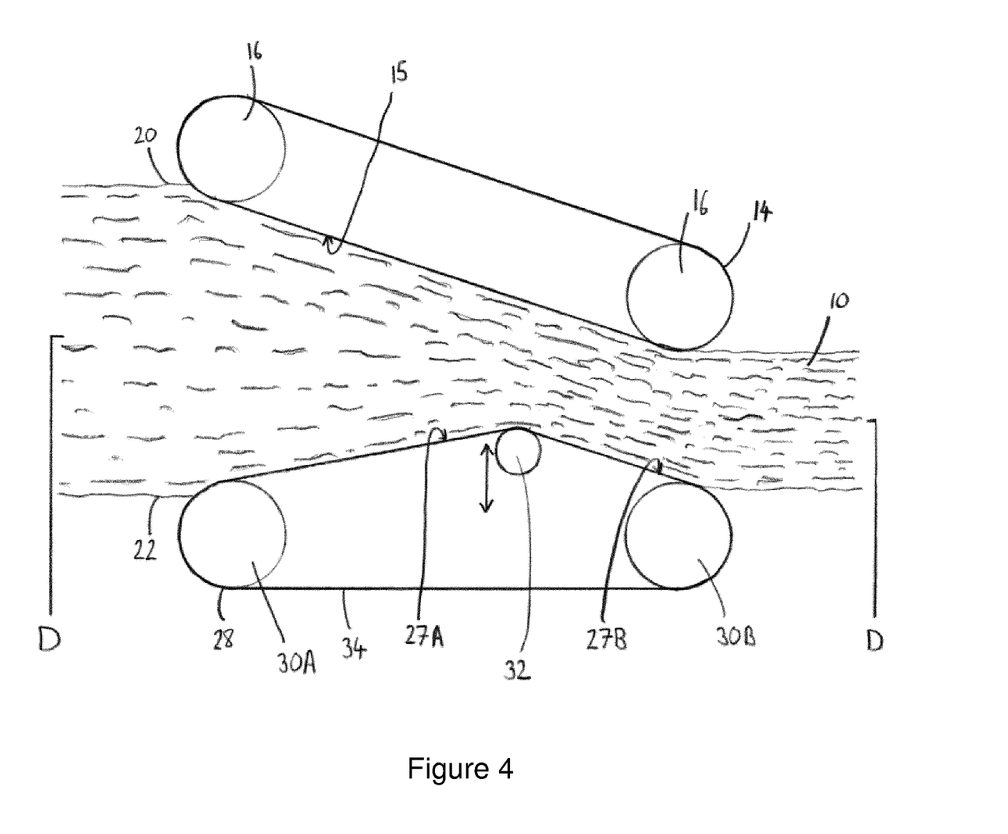
FIG. 4 is a side on view of yet another embodiment of a compression apparatus of the invention.

FIG. 4 shows a web 10 undergoing thickness compression by passage between two continuous compression surfaces along path D-D. The compression surfaces comprise an upper surface 27 of a lower conveyor belt 28, which upper surface is in contact with a lower major face 22 of the web, and a lower surface 15 of an upper conveyor belt 14, which lower surface is in contact with the upper major face 20 of the web.

The upper conveyor belt 14 is similar to the upper conveyor belts shown in FIGS. 2 and 3 with support rollers 16 at each end. The upper conveyor belt is inclined towards the path D-D along which the web 10 is transported, in the direction in which the web is transported.

The lower conveyor belt 28 has a different form from the upper conveyor belt. This is because the lower conveyor belt has at least three support rollers: at least two primary support rollers 30A, 30B, between which is located at least one secondary support roller 32.

The secondary support roller 32 is located closer to the path along which the web 10 is transported than at least the primary support roller 30A located earliest along the path of the web. This location of the secondary support roller relative to the path produces an incline in the belt 34 of the lower conveyor belt towards the path between at least one of the primary rollers and the secondary roller.

Due to the arrangement of the conveyor belts shown in FIG. 4, in the locations depicted in the figure, the secondary support roller 32 and the primary support roller 30B located furthest along the path of the web 10 are approximately the same distance from the path. These support rollers can of course be located so the respective distances between the support rollers and the path is different from one another.

Indeed, the secondary support roller 32 is moveable towards or away from the path of the web 10. This causes the angle of incline of the belt 34 towards the path between each of the primary support rollers 30 and the secondary support roller to be modifiable.

In FIG. 4, the secondary support roller 32 is moveable towards and away from the path by moving the secondary support roller vertically (as is indicated by the arrow). It would of course be possible to change the angle of incline of the belt by moving the secondary roller in other directions, such as diagonally or horizontally as long as it is moved towards or away from the path along which the web is transported. In this configuration the secondary support roller is only moveable vertically, and not in other directions.

By changing the angle of incline of the belt 34 between the primary support rollers 30 and the secondary support roller 32, the amount of compression applied by the upper surface 27 of the lower conveyor belt 28 is able to be modified. This is because the amount of compression applied by said surface is proportional to the angle of incline of the belt 34 relative to the path of the web 10.

Of course, due to the secondary roller 32, the upper surface 27 of the lower conveyor belt 28 is separated into two inclined surfaces 27A, 27B between the secondary support roller and each of the primary support rollers 30A, 30B. As such, each inclined surface 27A, 27B is delimited by the secondary support roller and the respective primary support roller.

As an example, the secondary roller 32 may be around 3 metres in length (the distance between the axially separated ends of the roller), and may have a diameter of around 10 to 30 centimetres. The particular length used will be chosen to ensure it is suitable for supporting the width of the conveyor belt or web that is to pass over it. As such, the secondary roller may be longer or shorter than the example length. Indeed, the secondary roller may have a length of between around 2 metres and around 4 metres.

The secondary roller 32 may be made of standard roller materials and can be retrofitted to a web processing line, or can be fitted when the processing line is constructed.

In some embodiments, the secondary roller 32 is moveable by use of a handle, which allows it to be moved when the belt 34 is moving, and in some embodiments, the secondary roller is locked or lockable in place when the belt is moving, and is moveable, for example by unscrewing the roller from a frame, when the belt is stationary.

Using an arrangement similar to the one shown in FIG. 4, the variation in the density through the thickness of the web after the web has been compressed has been shown to be reduced by between 40% and 50% over known thickness compression techniques. When the web also undergoes length compression, there is a further reduction in the density variation, which can be as much as a 70% to 80% reduction in the density variation over known thickness compression techniques.

As noted above, it is possible for a conveyor belt to have other support rollers. Should there be other support rollers located between either of the primary support rollers 30 and the secondary support roller 32, each of those other support rollers will be required to be moveable in the same direction as the secondary support roller when the secondary support roller is itself moveable, with the amount of movement corresponding to an a fraction of the movement of the secondary support roller that ensures the upper surface 27 is kept planar. Of course, if the upper surface is initially curved, and the curve is to be maintained, then the other support rollers will each need to be moveable by a certain amount so that the curve may be maintained.

By movement of a number of rollers, it would be possible to change the shape of at least the upper surface 27 of the lower conveyor belt 28, for example from planar to curved or vice versa. Of course, any movement of a support roller may cause the length of the route followed by the belt 34 to change, so there may be a system, such as another support roller that moves, adjusting the path length by an opposite and equivalent amount to the change caused by the movement to the secondary support roller 32, so that the belt is kept taut.

Additionally, instead of the lower conveyor belt shown in FIG. 4, a series of rollers could again be used in its place and perform the same function. When a series of rollers are used, each roller of the series of rollers would be arranged to form an inclined discontinuous surface that is moveable to adjust the incline by movement of each roller of the series of rollers. Also, it would be possible to use a series of rollers in place of the upper conveyor belt.

Further, in FIG. 4, there is only one conveyor belt with a portion that has an adjustable incline. It would also be possible to have both conveyor belts (or series of rollers) with at least a portion of each one having a variable incline or to have an upper conveyor belt with a portion with an adjustable incline instead of the lower conveyor belt having the portion with an adjustable incline.

The process of applying compression to the web using each of the arrangements shown in FIG. 2, 3 or 4 is to pass the web along a path. The web is subjected to thickness compression by applying compression to each of the two major opposing faces of the web. This is achieved by providing converging compression surfaces and compressing each of the major faces by passage of the web along the path between the converging compression surfaces that are continuous (such as a surface of a conveyor belt) or discontinuous (such as a series of rollers). To apply the compression to a major face of the web, a respective compression surface is inclined towards the path along which the web is being transported. As such, the compression surfaces converge towards the path either simultaneously or in series.

When using an arrangement where at least one of the compression surfaces has an adjustable incline, as may be the case in FIG. 2, 3 or 4, the incline can be adjusted before the web is passed through the compression surfaces or during the period in which the web is being between the compression surfaces.

An alternative to using conveyor belts is to use guiding surfaces over which the web is able to slide when transported along its path. When such surfaces are used, the web may be transported by rollers or conveyor belts located at various points along the guiding surfaces, or could be pushed or pulled from an end or the sides of the web (i.e. the minor faces) could be in contact with some means of transport such as a conveyor belt or roller.

Another alternative is to use a system with conveyor belts that has a lower conveyor belt and an upper conveyor belt. The lower conveyor belt is positioned substantially parallel to the direction of travel of the web, or is inclined towards the mid-point of the web. The amount of incline of the lower belt may be adjustable. The upper conveyor belt is, as a whole, rotatable around a roller that is located furthest along the path along which the web is travelling (i.e. at the downstream end of the upper conveyor belt) to adjust the amount of incline of the upper conveyor belt. Such a system is useful when multiple webs are being processed on a single processing line and there is variation in thickness between respective webs, and/or are thick, such as at least 1 metre in thickness.

The upper conveyor belt has a lower surface that is in contact with the web during processing. The lower surface may be a single flat surface, or may be have at least two parts, each of which are flat and are held by one or more supporting rollers so as to produce a vertex with a reflexive angle between the two parts of the surface. This is usually provided so that compression can be applied to the web with at least one of the parts of the lower surface.

When the lower surface has at least two parts, the upper conveyor belt can be positioned so that one part of the lower surface is parallel to the path along which the web travels, and another part of the surface is inclined towards the path. Usually the inclined part of the surface will be the upstream part of the lower surface (i.e. the part of lower surface that the web first comes into contact with).

As the upper conveyor belt is rotatable around the most downstream roller, it is able to be raised to apply compression to a web of greater thickness, or lowered to apply compression to a web of lesser thickness depending on the initial position of the upper conveyor belt. When raised, the rotation increases the distance between the upstream end of the upper conveyor belt and the lower conveyor belt. When rotated up, both parts of the lower surface of the upper conveyor belt will be inclined towards the path along with the web travels. Hydraulics may be used to rotate the upper conveyor belt.

Figure 5:
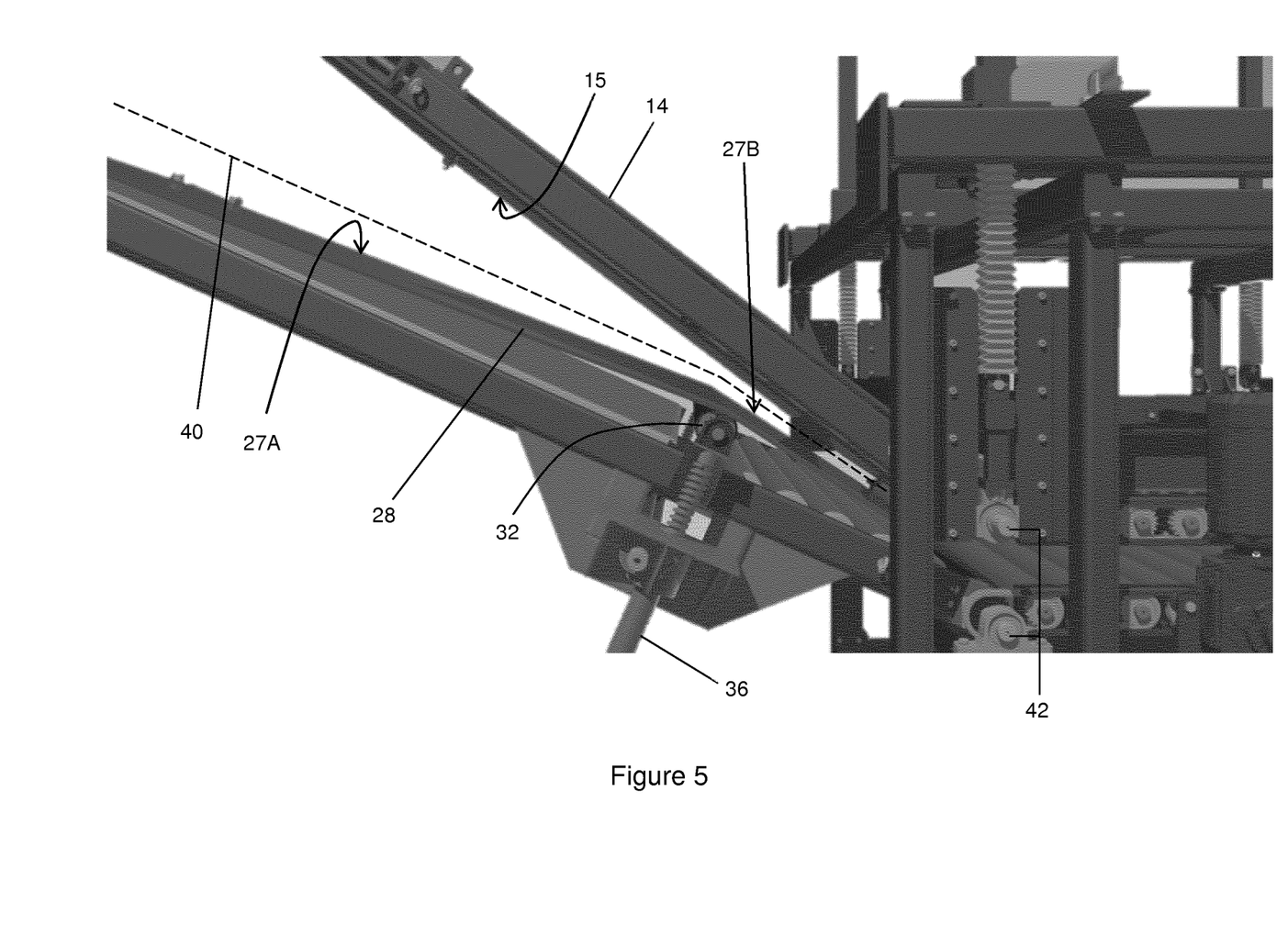
FIG. 5 is a perspective view of an embodiment similar to that shown in FIG. 4.

FIG. 5 shows a similar embodiment to that shown in FIG. 4 in a setting similar to that which the compression apparatus is used. The web is not shown in FIG. 5, which allows the relative positioning of the various components to be seen.

As with FIG. 4, FIG. 5 shows an upper conveyor belt 14 delimited by rollers (not shown), the underside of which provides an upper compression surface 15 in use. There is also a lower conveyor belt 28. The lower conveyor belt is delimited by rollers (not shown) and has a support roller 32 provided between the delimiting rollers that causes the upper surface 27 of the conveyor belt to be inclined relative to the lower surface (not shown) of the lower conveyor belt.

The incline of the upper surface 27 of the lower conveyor belt 28 produced by the support roller 32 causes the upper surface to have a first inclined surface 27A from a upstream end of the lower conveyor belt to the support roller and a second inclined surface 27B from the support roller to a downstream end of the lower conveyor belt.

When in use, the upper conveyor belt 14 and the lower conveyor belt 28 transport the web along path 40. The path is parallel to the lower surface of the lower conveyor belt from the upstream end of the compression apparatus until it reaches the support roller 32, after which it is approximately equidistant from the upper conveyor belt and the lower conveyor belt. The reason that the path is parallel to the lower surface of the lower conveyor belt at its upstream end instead of equidistant between the conveyor belts is because the path indicates the direction of travel of the web, not its mid-point. As such, since compression is applied by the compression surfaces (the lower surface 15 of the upper conveyor belt, and the first inclined surface 27A of the lower conveyor belt), although the compression surfaces are inclined, the general direction of travel is still parallel to the lower surface of the lower conveyor belt.

The position of the support roller 32 is adjustable. This allows the incline of the first inclined surface 27A and the second inclined surface 27B to be adjusted. This in turn allows the amount of compression applied to the web by each of these inclined surfaces to be adjusted.

The position of the support roller 32 is adjusted by an adjustment means 36. The adjustment means comprises a movement motor (not shown) and movement sensors (not shown). This enables the assembly to which the support roller is attached to be moved. In this embodiment, the position of the support roller is only moveable along a single axis (not shown). This axis is approximately perpendicular to the lower surface of the lower conveyor belt and is equivalent to the movement "vertically" mentioned above in relation to FIG. 4. The reason the movement is not "vertical" in FIG. 5 is that the upper conveyor belt 14 and the lower conveyor belt 28 are rotatable about their connections 42 to the downstream sections of the apparatus and are shown in FIG. 5 with the lower surface of the lower conveyor belt in a non-horizontal position. Otherwise, when the lower surface is horizontal, the axis along which the support roller is able to be moved is substantially vertical.

The adjustment means is able to move the supporting roller 32 electrically up and down. The movement provides an adjustment in the thickness compression applied to the lower layers of the web when the web passes through the compression apparatus. The final amount of thickness compression to be applied is dictated by the product specification, and further thickness compression is able to be applied by a downstream thickness compression conveyor as well if needed. This ensures that the product has the correct final compression required for the desired product quality.

The amount of compression applied by the inclined surfaces is dictated by the desired product quality relative to the deviation in density between the top and bottom layers of the web that would be obtained without the use of the invention; the greater the deviation under these circumstances, the more compression from the inclined surfaces is required to reduce the deviation. This requires the support roller to increase the incline of the upper surface 27 of the lower conveyor belt 28. However, it is important that the fibres are not damaged by the inclined surfaces so that the web material's ability to recover is not at risk.

The movement sensors mentioned above are set to monitor the amount by which the support roller 32 has been moved. This is to reduce the possibility of the full stretch of the lower conveyor belt being exceeded by movement of the support roller away from the lower surface of the lower conveyor belt 28. This thereby reduces the likelihood of the lower conveyor belt being damaged by movement of the support roller. The movement sensors also monitor for movement so that the support roller being moved away from the lower surface of the lower conveyor belt too far so that it will make contact with the upper conveyor belt 14 can be restricted.

As well as being able to increase the incline of the inclined surfaces 27A, 27B of the lower conveyor belt 28, the support roller 32 can reduce the incline of these surfaces to zero. This is achieved by the support roller being able to be moved in line with the rollers delimiting the lower conveyor belt. In FIG. 5, this is shown by the space between rollers downstream of the support roller and a support surface upstream of the support roller that assist in supporting the lower conveyor belt when the support roller is not raised to incline the upper surface 27 of the lower conveyor belt.

As the support roller can be moved electronically, the positioning of the support roller can be precise, such as with a positioning accuracy of +/−0.5 millimetres (mm) for example.

Using a compression apparatus similar to that shown in FIG. 5, with a moveable support roller as shown, the data below has been produced as a comparison with a compression apparatus without a moveable support roller. This shows that for a compression apparatus as described herein with compression applied to each of the two major faces of the web there is less deviation in the density of the web between the upper major face and the lower major face than for a compression apparatus that only applies compression to one of the major faces of the web, such as an apparatus only having a flat lower conveyor belt with an inclined upper conveyor belt. The density set for the web in each set of data is shown in kilograms per cubic metre ($kg/m^3$) and the desired web thickness for each data set is 50 mm.

| Including support roller Desired web density: 37.0 $kg/m^3$ | | | Excluding support roller Desired web density: 35.5 $kg/m^3$ | | |
| --- | --- | --- | --- | --- | --- |
| Lower surface density | Upper surface density | Density difference | Lower surface density | Upper surface density | Density difference |
| 38.4 | 38.8 | −0.4 | 35 | 36.7 | −1.7 |
| 37.8 | 37.3 | 0.5 | 35.3 | 36 | −0.7 |
| 37.8 | 37.7 | 0.1 | 35.7 | 35.7 | 0 |
| 37.2 | 38 | −0.8 | 33.7 | 36.3 | −2.6 |
| 36.8 | 37.2 | −0.4 | 34 | 34.9 | −0.9 |
| 37.9 | 37.3 | 0.6 | 34.3 | 35.7 | −1.4 |
| 37.6 | 37.3 | 0.3 | 33.7 | 35.3 | −1.6 |

-continued

| Including support roller Desired web density: 37.0 kg/m³ | | | Excluding support roller Desired web density: 35.5 kg/m³ | | |
|---|---|---|---|---|---|
| Lower surface density | Upper surface density | Density difference | Lower surface density | Upper surface density | Density difference |
| 37.4 | 37.3 | 0.1 | 34.7 | 36.7 | −2 |
| 37.5 | 37.7 | −0.2 | 34 | 37 | −3 |
| 37.5 | 37.3 | 0.2 | 34.7 | 35.6 | −0.9 |
| 37.6 | 37.7 | −0.1 | 34.3 | 36 | −1.7 |
| 35.5 | 35.6 | −0.1 | 34 | 37.7 | −3.7 |
| 35.9 | 35.7 | 0.2 | 35.5 | 35.7 | −0.2 |
| 36.2 | 35.7 | 0.5 | 34 | 36.3 | −2.3 |
| 35.6 | 37.1 | −1.5 | 35 | 35.2 | −0.2 |
| 36.5 | 36 | 0.5 | 33.3 | 35.3 | −2 |
| 36.7 | 37.1 | −0.4 | 34.7 | 34 | 0.7 |
| 37.7 | 36.7 | 1 | 34.4 | 36.3 | −1.9 |
| 36.9 | 36.7 | 0.2 | 34.3 | 37.3 | −3 |
| 36.9 | 36.8 | 0.1 | 34.7 | 35.6 | −0.9 |
| 36.6 | 37 | −0.4 | 34.3 | 37.3 | −3 |
| 38 | 36.8 | 1.2 | 33 | 36.3 | −3.3 |
| 37.3 | 36.5 | 0.8 | 35.7 | 36.3 | −0.6 |
| 37 | 37.1 | −0.1 | 33.7 | 37 | −3.3 |
| 37.1 | 36.8 | 0.3 | 35 | 35.5 | −0.5 |
| 36.9 | 37.1 | −0.2 | 34.7 | 36.7 | −2 |
| 37.6 | 37.9 | −0.3 | 35 | 38 | −3 |
| 37.2 | 37 | 0.2 | 36.1 | 36 | 0.1 |
| 38.3 | 35.5 | 2.8 | 34.7 | 35.7 | −1 |
| 35.6 | 38.5 | −2.9 | 33.7 | 35 | −1.3 |
| 36.1 | 38.1 | −2 | 34.3 | 36.7 | −2.4 |
| 37.3 | 36.6 | 0.7 | 35 | 37.3 | −2.3 |
| 36.6 | 37.5 | −0.9 | 35.8 | 37.7 | −1.9 |
| 37.6 | 35.6 | 2 | 34.3 | 36 | −1.7 |
| 35.8 | 35.5 | 0.3 | 34 | 35.5 | −1.5 |
| 35.8 | 36.5 | −0.7 | 34.6 | 36.8 | −2.2 |
| 35.3 | 35.1 | 0.2 | 35.8 | 35.6 | 0.2 |
| 35.7 | 37.2 | −1.5 | 35.7 | 36.1 | −0.4 |
| 35.8 | 35.2 | 0.6 | 34.8 | 35.5 | −0.7 |
| 37.8 | 37.8 | 0 | 34.2 | 35.1 | −0.9 |
| 37.8 | 36.7 | 1.1 | 34.9 | 36.6 | −1.7 |
| 36 | 36.4 | −0.4 | 34.9 | 36.6 | −1.7 |
| 35.9 | 35.2 | 0.7 | 35.7 | 36.3 | −0.6 |
| 35.2 | 35.3 | −0.1 | 34.3 | 35 | −0.7 |
| 36.1 | 35.1 | 1 | 35.1 | 36.3 | −1.2 |
| 36.5 | 36.8 | −0.3 | 34.7 | 38 | −3.3 |
| 35.3 | 35.3 | 0 | 35.6 | 36 | −0.4 |
| Average 36.8 | 36.7 | 0.05 | 34.66 | 36.17 | −1.52 |

From the data it can be seen that the average difference in density between the density in the upper major face of each web and the lower major face of each web is 0.05 when a support roller is used and is −1.52 when the support roller is not used. Accordingly, the difference is almost eliminated when a support roller is used. This is surprising since it had previously been expected that even without a support roller the reaction force on the lower major face of the web from the lower conveyor belt was sufficient to provide suitable compression of the lower major face of the web.

Testing has been conducted on webs with a density of about 25 kg/m³ to webs with a density of about 160 kg/m³ and has been found to have this beneficial effect. In particular, it has been found to be particularly effective on webs with a density of about 25 kg/m³ to webs with a density of about 50 kg/m³ where there have been particular problems with density variation across the thickness of the web in the past.

The invention claimed is:

1. A method of compressing an uncured man-made vitreous fibre web conducted by a compression unit on a production line prior to entering a curing oven, the web having two opposed major faces, wherein the method comprises the steps:
   passing the uncured web along a path; and
   subjecting the uncured web to thickness compression, by the compression unit, by applying compression to the two major opposed faces of the uncured web,
   wherein
   compression of each of said major faces of the uncured web is applied by passing the path between converging continuous compression surfaces,
   wherein
   the respective major face of the uncured web that is being compressed is in contact with one of the converging compression surfaces,
   wherein
   each surface of the converging compression surfaces through which the path passes is inclined towards the path, providing an upstream end of each respective surface at a greater distance from the path than a downstream end of the respective surface, and compression is thereby applied to the two opposing major faces simultaneously,
   and wherein
   each inclined converging compression surface applies an amount of compression to the major face of the uncured web with which the respective inclined converging surface is in contact, wherein one surface is provided by a conveyor belt with at least two primary support rollers and at least one secondary support roller located between the primary support rollers, the position of the at least one secondary support roller being moveable towards and away from the path, the amount of compression applied to at least one of the two opposing major faces of the uncured web between the at least two primary support rollers is adjustable by moving the at least one secondary support roller.

2. A method according to claim 1, wherein the web is a secondary web formed from a cross-lapped primary web, which primary web is a fibre web formed by collecting mineral melt fibres on a collector.

3. A method according to claim 1, wherein the amount of compression applied by each inclined converging compression surface is proportional to an angle of incline of the respective inclined converging compression surface, and wherein the amount of compression is adjusted by altering the angle of the incline towards the path of the inclined converging compression surface that applies compression.

4. A method according to claim 1, wherein both of the converging compression surfaces are formed of at least part of a conveyor belt that transports the web.

5. A method according to claim 1, wherein each support roller that is moved has a smaller diameter than the other support rollers.

6. A method according to claim 1, wherein each support roller that is moved has a diameter of about 0.10 metres (m) to about 0.30 metres.

7. A method according to claim 1, where each support roller that is moved has a length of about 2 metres to about 4 metres.

* * * * *